March 19, 1940.　　G. G. McNAMARA　　2,194,207
BRAKE CONTROL MEANS
Filed Dec. 1, 1938　　2 Sheets-Sheet 1
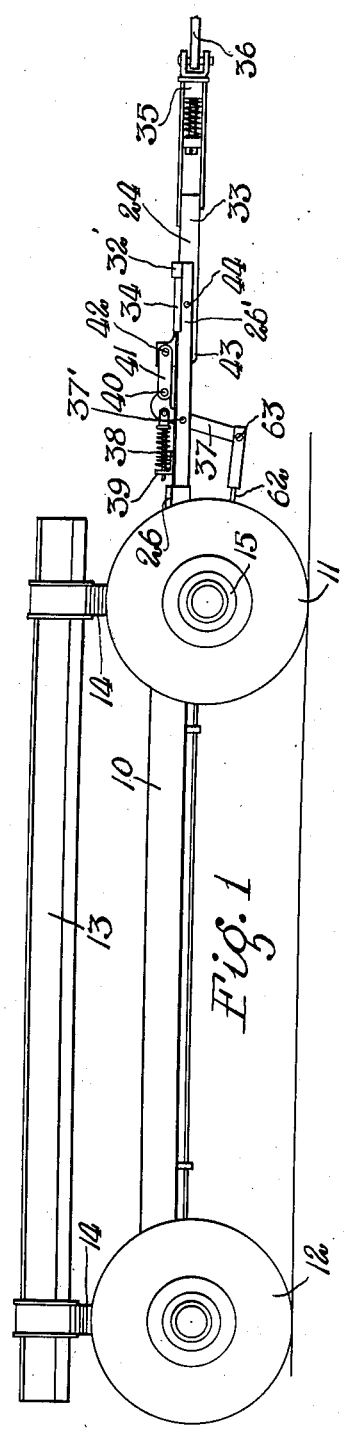
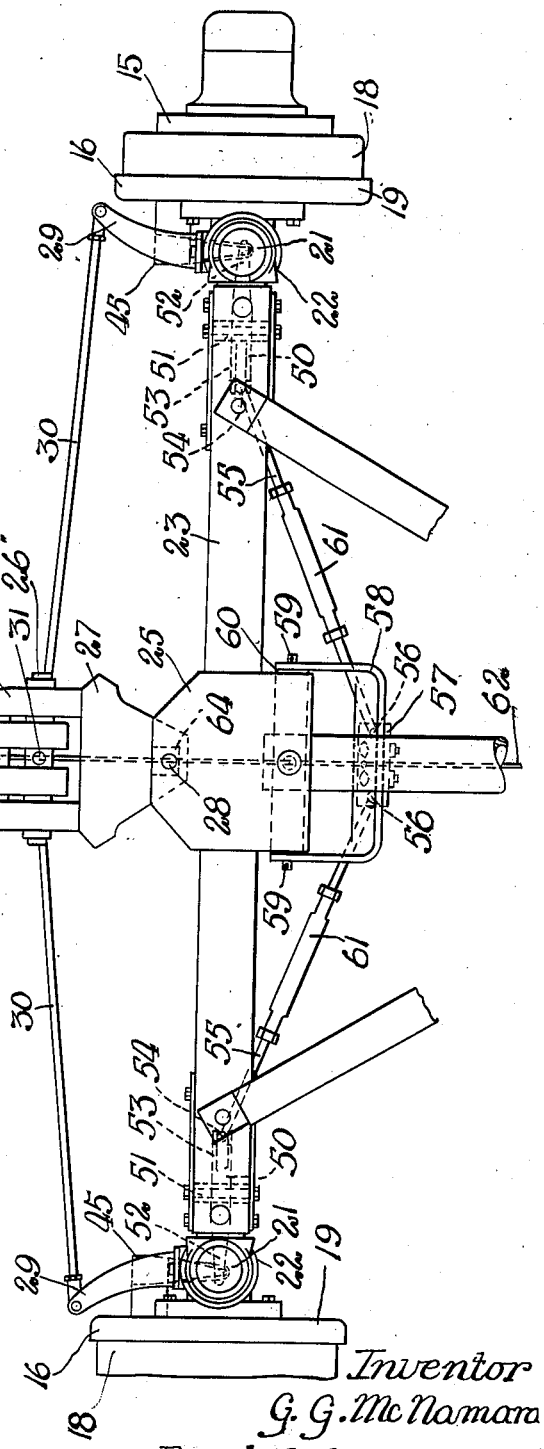
Inventor
G. G. McNamara
By V. J. Lassagne Atty.

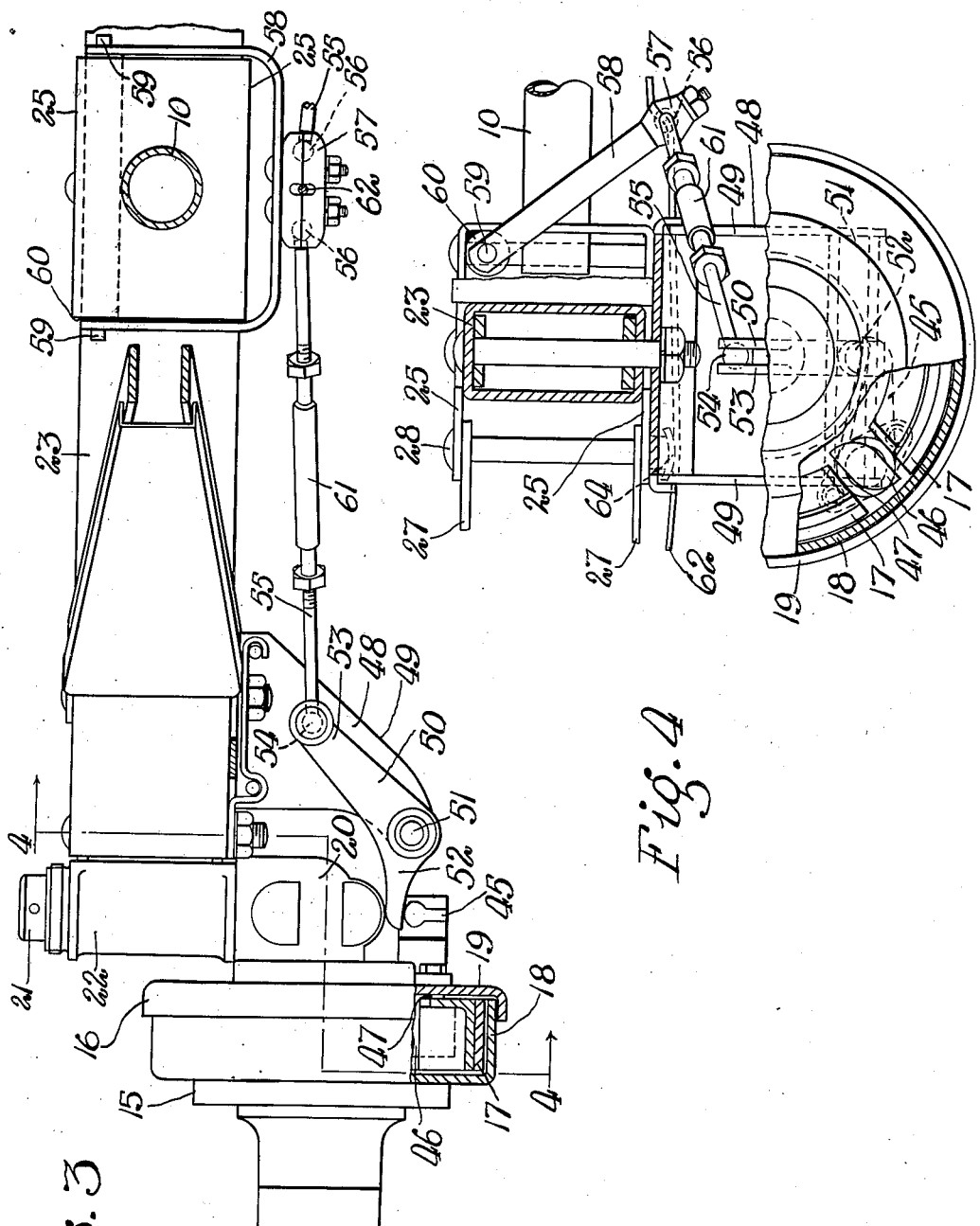

Patented Mar. 19, 1940

2,194,207

UNITED STATES PATENT OFFICE 2,194,207

BRAKE CONTROL MEANS

Gordon G. McNamara, Chicago, Ill., assignor to International Harvester Company, a corporation of New Jersey Application December 1, 1938, Serial No. 243,425

4 Claims. (Cl. 188—142)

This invention relates to a brake mechanism and more particularly to an arrangement of brake applying linkage for operating brakes on swiveled wheels carrying a vehicle. Still more particularly, the invention relates to brake applying mechanism for use in a trailing vehicle in which the vehicle includes a draft device having brake control means, said means being interconnected with the brake applying mechanism.

It is desirable in trailing vehicles to provide brakes for the wheels thereof, and in many States such brakes are required by law. When a trailing vehicle is provided with brakes, it is desirable that they be interconnected with control means generally incorporated in a draft device connected between the trailing vehicle and the draft vehicle. The problem of providing suitable brake applying means is more pronounced in trailing vehicles of the four-wheel type since the front wheels are swiveled or journaled on the front axle of the vehicle and are connected by suitable steering linkage to the draft device. The same problem, of course, arises in the provision of brake applying means for automobiles, or the like, in which brakes are provided on the steerable front wheels. In order that the utmost efficiency be obtained from the brake mechanism, it is important that a uniform braking result be attained regardless of the positions of the front wheels with respect to the vehicle. In short, it is highly desirable that the brake applying linkage be operable to apply the brakes when the front wheels are steered or are being steered.

The principal object of the invention, then, is to provide improved brake applying means for operating a brake carried by a steerable wheel.

An important object is to provide a pair of operatively interconnected levers, one of which is carried by the brake and arranged to operate the same, and the other of which is carried by the vehicle or a suitable support thereon, the levers being so arranged that their point of engagement moves generally along a straight line extended through the axis of the pivot on which the steerable wheel is swiveled.

Another important object is to provide means for suitably connecting the brake applying levers to brake control means incorporated in a draft device of a trailing vehicle.

Another object is to arrange the brake control means and the brake applying levers in such a manner that longitudinal movement of the brake control means will be transferred into substantially lateral and vertical movement of the brake applying levers.

And still another object is to provide the brake applying means in such a manner that will permit installation thereof of any type of vehicle without materially altering the construction or design thereof.

Briefly and specifically, these and other desirable objects are achieved by the provision of a brake lever pivoted on a brake housing, which is in turn carried by a steerable wheel pivoted or swiveled on a vertical axis on the transverse axle of a vehicle. The pivoted lever extends substantially horizontally and has its end portion disposed in vertical alinement with the axis of the pivot and is arranged to operate the brake shoes contained in the brake housing. The wheel, brake housing and lever pivot as a unit about the aforesaid vertical axis. A bell-crank is pivoted on a horizontal axis on the transverse axle and has one arm thereof engaging the end portion of the brake operating lever. The other arm of the bell-crank is suitably connected to longitudinally movable control means on the vehicle frame. Movement of the bell-crank about its axis actuates the brake operating lever to apply the brake, the point of engagement between the bell-crank and the lever moving substantially along a line extended through the vertical swivel axis. The point of engagement between the two levers remains substantially on this vertical line when the wheel is steered or being steered. The means for operating the bell-cranks moves longitudinally from a position behind the front axle and theretowards, being connected to the bell-cranks by operating links, the arrangement supplying a desirable mechanical advantage for quick stops.

A more complete understanding of the objects of the invention may be had from the following detailed description taken in conjunction with the accompanying sheets of drawings, in which:

Figure 1 is a side elevation view of a trailing vehicle showing generally the draft device and the brake control means thereon;

Figure 2 is an enlarged plan elevational view of the forward portion of the vehicle showing the improved brake applying means;

Figure 3 is a rear elevational view of one side portion of the transverse front structure of the vehicle; and, Figure 4 is a side substantial view, partly in section, as viewed substantially along the line 4—4 of Figure 3.

While the following description of the improved brake applying means is directed to a trailing vehicle, it will be understood that the construction and arrangement of the parts may be suitably applied to any type vehicle having brakes. The trailing vehicle chosen for the purpose of illustration comprises generally a longitudinal frame including a longitudinal reach 10 carried by front and rear wheels 11 and 12, respectively. The frame further includes a body portion 13 suitably supported at its front and rear, as at 14. The rear wheel and axle structure may be conventional and forms no part of the present invention, being, therefore, only generally indicated in Figure 1.

Each front wheel 11 includes a central hub 15, which is provided with a brake housing 16 within which is located a retarding means in the form of a pair of brake shoes 17, which act on the circumferential portion of a brake drum 18, which is carried for rotation with the hub 15. The brake housing 16 includes an inner cover plate 19 enclosing the inner side of the brake drum 18. This plate is rigidly carried by a member in the form of a steering knuckle 20 and thus is held against rotation with respect to the wheel and brake drum. The brake shoes 17, as is conventional, are suitably carried by the inner plate 19. The steering knuckle 20 includes the conventional horizontal spindle on which the front wheel and hub are rotatably carried. The knuckle further includes a vertically extending king pin 21, which is suitably journaled or swiveled on a vertical axis on a sleeve 22 provided on a bracket rigidly carried by a transverse front axle structure 23. This front axle structure is preferably box-like in cross-section and is suitably secured to the front end portion of the reach 10.

The vehicle includes steering means for the steerable front wheels 11 and in the present instance comprises suitable interconnecting linkage between the wheels and a draft device 24 extending longitudinally forwardly from the front end of the vehicle. The front axle structure has rigidly secured to its upper and lower surfaces a pair of plates 25. The rear portion of the draft device comprises a pair of laterally spaced draft or angle members 26, which are rigidly secured at their rear ends to a pair of vertically spaced plates 27, which in turn are pivotally connected by a pivot pin 28 to the plates 25 on the front axle structure. Each steering knuckle 20 is provided with a forwardly extending steering arm 29 and each arm is suitably connected by a steering link 30 to the draft device 24, as at 31. Lateral swinging movement of the draft device 24 about the pivot 28 steers the wheels 11 in a well known manner.

The draft device 24 includes a pair of laterally spaced, longitudinally extending draft members 26' in the form of angle bars, pivoted at 26'' to the angle members 26. These bars extend a substantial distance forwardly and are rigidly spaced and cross-connected by a member 32. A third draft member 33 is disposed between the members 26' and extends longitudinally forwardly therefrom. This member is provided with a guide member 34 rigidly secured to its upper edge, said guide member including side portions overlying and cooperating with the horizontal flange portions of the angle bars 26'. This construction, including the arrangement of the brake control means to be hereinafter described, is similar to the construction disclosed in assignee's patent No. 2,099,816 to A. C. Lindgren, patented November 23, 1937. The member 32, which is rigidly carried by the angle bars 26', provides a suitable stop portion for limiting forward movement of the draft member 33 with respect to the bars 26', the stop being effected when the member 34 abuts the member 32. The draft member 33 is provided at its forward end with suitable means 35 for connecting the trailing vehicle to a draft vehicle, a draw-bar or draft element of the draft vehicle being generally indicated at 36.

The brake control means included in the draft device, and as particularly disclosed in the aforesaid Lindgren patent, comprises a substantially vertical member or arm 37 disposed between and pivoted at 37' on the spaced angle bars or members 26'. Resilient means in the form of a compression spring 38 is connected at one end to that portion of the member 37 projecting above the members 26' and at its other end is suitably carried in a bracket 39 secured to the upper surfaces of the members 26. This spring tends to urge the upper portion of the member 37 forwardly. The member 37 is provided at its upper portion with an integral forwardly extending arm portion, which is pivotally connected at 40 to a link 41, which, in turn, is pivotally connected at 42 to an up-turned end portion 43 of the draft member 33. It will be noted that the pivot points 40, 42 and 37' are not in alinement, but only approach alinement, thus providing a position, the action of the spring 38 providing a lock of a well known type. Each angle bar or member 26' is provided with a transverse opening 44, which is in alinement with a similar opening in the member 33, through which opening a pin may be inserted to prevent relative movement between the parts 26' and 33 for purposes to hereinafter appear. Forward movement of the draft vehicle maintains the parts in the positions illustrated in Figure 1, the general function of the draft device and brake control means being to operate to apply the brakes on the trailing vehicle when the speed of the draft vehicle is decreased.

It is an important part of the present invention to provide means interconnecting the brake control means with the brakes on the wheels 11. Each brake means includes an arm 45 pivotally carried by the inner plate 19 of the brake housing 16. A cam member 46 is rigidly carried by a cross-shaft 47, which is operatively connected to the arm 45. In the present instance, the arm 45 is pivoted on a horizontal axis spaced forwardly from, below, and parallel to the spindle axis of the wheel 11. The arm extends rearwardly from its pivot axis to a point in vertical alinement with the axis of the king pin 21. Vertical movement of the arm about its axis moves the cam 46 to spread the shoes 17 for applying the brake. It will be understood that any suitable arrangement of parts may be provided for retarding the speed of the wheel.

The front axle structure 23 carries at opposite ends thereof a bracket 48, which comprises a pair of longitudinally spaced, vertically extending side members 49. A bell-crank 50 is disposed between the side members 49 and is pivotally carried thereon on a horizontal pin 51. In the preferred construction illustrated, the horizontal axis 51 is at right angles to the vertical swivel axis and substantially parallel to the plane of the wheel 11 in a straight-ahead position, and the bell-crank is adapted to move substantially laterally and vertically through a plane passed vertically through the king pin 21. It will be understood, of course, that similar construction is provided at both sides of the front axle structure. The bell-crank 50 includes a pair of arms or levers 52 and 53. The arm 52 extends laterally below the front axle structure 23 and below the steering knuckle 20 where it is interconnected with or otherwise operatively engages the rear end portion of the lever 45. It will be noted that the point of engagement between the levers 45 and 52 is below and in vertical alinement with the swivel axis. The arm or lever 53 of the bell-crank 50 extends laterally inwardly and upwardly and is pivotally connected by a ball joint at 54 to a transversely and rearwardly extending link 55. The other end of the link 55 is pivotally connected through the medium of a ball joint 56 to a suitable clamp member 57 rigidly carried by a longitudinally movable means in the form of a bail or swingable member 58. This swingable member 58 is pivoted on a transverse pivot pin 59 carried by a portion of the front axle 23, as at 60. The intermediate portion of the link means 55 is provided with adjustable means 61 in the form of a sleeve and pair of nuts. In its normal position, the bail or swingable member 58 is inclined downwardly and rearwardly, as best shown in Figure 4, and is adapted to be swung forwardly to the transverse line drawn through the brake actuating members 45 and 50, generally in the present instance, being on a line parallel to the front axle structure 23.

The clamp member 57 is further utilized to hold securely a brake cable 62, which extends longitudinally forwardly to a point 63, where it is suitably connected to the lower portion of the arm 37 carried by the draft device 24. The cable 62 is suitably guided, as at 64, to prevent interference thereof with portions of the front axle structure. Brakes may be provided on the rear wheels 12 of the vehicle and may be actuated by a rearward continuation of the cable 62, as shown in Figure 1. As previously mentioned, the brakes for the rear wheels may be of any suitable type and form no part of the present invention.

From the foregoing description of the improved construction, it will be seen that means have been provided for applying the brakes on the front wheels 11, which means are further connected to brake control means included in the draft device 24. The following description will pertain to the mode of operation of the brakes through the medium of the brake control means and novel arrangement of brake applying levers and linkages, as hereinbefore set forth.

As is well known to those skilled in the art, the trailing vehicle has a serious effect on the draft vehicle when the speed of the draft vehicle is decreased. In order to obviate this effect, brakes are provided on the trailing vehicle, thus diminishing the braking effort required by the operator of the draft vehicle to stop both vehicles. When the speed of the draft vehicle is decreased, the brake control means illustrated in Figure 1 becomes operative, the linkage comprising the parts 37 and 41 is unlocked, and the lower part of the member 37 swings forwardly about its pivot on the angle bars or members 26'. The unlocking of the over-center linkage is effected by the rearward movement of the member 33 with respect to the members 26' caused by the pressure of the vehicle against the linkage. As the lower end of the member 37 swings forwardly, the swingable member or bail 58 is also swung forwardly through the medium of the brake cable 62. As the bail member 58 moves longitudinally forwardly, the arms 53 of the bell-cranks 50 are moved laterally because of the interconnecting means 55, gradually increasing the mechanical advantage. As the bell-cranks pivot about their respective horizontal axes, the respective arms or levers 52 actuate the brake operating levers 45, thus applying the brakes in the wheels 11. The cable 62 similarly operates brakes, not shown, on the rear wheels 12. Because of the arrangement between the arm 52 of the bell-crank 50 and the respective brake operating lever 45, the point of engagement between these two parts moves substantially along a vertical line extended through the vertical pivot or swivel axis between the front axle structure and the wheel 11. The arms 45 and 52 remain in constant engagement regardless of the position of the front wheels, and uniform brake pressure or effort is sufficient at all times to apply the brakes.

When the speed of the draft vehicle is increased, forward movement of the draft member part 33 with respect to the angle bars or members 26' restores the brake control parts 37 and 41 to their original positions and the brakes in the trailing vehicle are, of course, released. The holes 44 in the members 26, as previously described, are adapted to receive a pin which passes also through an alined opening in the member 33 for the purpose of securing said parts together against relative movement in the event that it is desirable to back the trailing vehicle. It will be understood that any suitable means may be provided for this purpose.

From the foregoing description it will be seen that improved brake applying means has been provided and that these means have been suitably interconnected with a desirable form of brake control means for applying the brakes on a trailing vehicle when the speed of the draft vehicle is decreased. It will be appreciated, of course, that the same means or parts thereof may be similarly utilized in any type vehicle in which brakes are employed, and further that numerous modifications and alterations may be made in the construction without departing from the spirit and scope of the invention as defined in the appended claims.

What is claimed is:

1. In a vehicle having a longitudinal frame carried on a pair of transversely alined wheels, brakes on the wheels, and a pair of transversely alined brake actuating means for the brakes, the combination with said means of a brake control means mounted for movement longitudinally of the frame and normally disposed longitudinally spaced from a transverse line drawn through the actuating means and adapted to be moved toward said line in applying the brakes, and interconnecting means operatively associated respectively between the actuating means and the control means and operable by the control means to move the actuating means to apply the brakes when the control means is moved longitudinally toward said transverse line.

2. In a vehicle having a longitudinal frame carried on a pair of transversely alined wheels, brakes on the wheels, and a pair of transversely alined brake actuating means arranged to actuate respective brakes, said means being movable transversely of the frame and toward the wheels when the brakes are applied, the combination with said means of a control member mounted for movement longitudinally of the frame and normally disposed longitudinally spaced from a line drawn transversely through the actuating means and movable toward said line when the brakes are applied, and a pair of interconnecting means operatively associated respectively between the actuating means and the control means, whereby the actuating means may be moved transversely of the frame and toward the wheels when the control means is moved longitudinally toward said transverse line.

3. In a trailing vehicle including a frame carried on a wheel and having a draft device adapted to be connected to a draft vehicle, a brake for the wheel, and brake control means associated with the draft device and the brake for applying the brake upon deceleration of the draft vehicle, the combination with said means of a member carried by the frame for movement longitudinally thereof and connected to the draft device, a brake arm arranged to operate the brake, a lever carried by the frame and movable laterally and vertically with respect thereto and engaging the brake arm, and a link pivotally connected at one end to the lever and at the other end to the aforesaid longitudinally movable member, said link being normally disposed at an acute angle to the longitudinal axis of the frame and movable to a position at right angles to said axis when the member is moved longitudinally, thereby moving the lever laterally and vertically to engage the brake arm for applying the brake.

4. In a vehicle including a frame carried on a wheel, a brake for the wheel and brake control means associated with the brake for applying the brake, said means comprising a member carried by the frame for movement longitudinally thereof, a brake arm arranged to operate the brake, a lever carried by the frame and movable laterally with respect thereto and engaging the brake arm, and a link pivotally connected at one end to the lever and at the other end to the aforesaid longitudinally movable member, said link being normally disposed at an acute angle to the longitudinal axis of the frame and movable to a position at right angles to said axis when the member is moved longitudinally, thereby moving the lever laterally to engage the brake arm for applying the brake.

GORDON G. McNAMARA.